US011354531B2

(12) United States Patent
Barua et al.

(10) Patent No.: US 11,354,531 B2
(45) Date of Patent: Jun. 7, 2022

(54) SYSTEM AND METHOD FOR ENABLING ROBOT TO PERCEIVE AND DETECT SOCIALLY INTERACTING GROUPS

(71) Applicant: Tata Consultancy Services Limited, Mumbai (IN)

(72) Inventors: Hrishav Bakul Barua, Kolkata (IN); Pradip Pramanick, Kolkata (IN); Chayan Sarkar, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 58 days.

(21) Appl. No.: 17/138,224

(22) Filed: Dec. 30, 2020

(65) Prior Publication Data
US 2021/0406594 A1  Dec. 30, 2021

(30) Foreign Application Priority Data
Jun. 24, 2020  (IN) .............................. 202021026738

(51) Int. Cl.
*G06K 9/00* (2022.01)
*G06K 9/62* (2022.01)
*G06V 30/194* (2022.01)
*G06T 7/00* (2017.01)

(52) U.S. Cl.
CPC ......... *G06K 9/6215* (2013.01); *G06K 9/6269* (2013.01); *G06K 9/6277* (2013.01); *G06T 7/0012* (2013.01); *G06V 30/194* (2022.01); *G06T 2207/10016* (2013.01); *G06T 2207/20081* (2013.01); *G06T 2207/30008* (2013.01)

(58) Field of Classification Search
None
See application file for complete search history.

(56) References Cited

U.S. PATENT DOCUMENTS

| | | | | |
|---|---|---|---|---|
| 9,672,428 | B2* | 6/2017 | Vazquez | .............. G06K 9/6296 |
| 9,785,838 | B2* | 10/2017 | Vazquez | ................ G06V 40/10 |
| 2017/0076157 | A1 | 3/2017 | Vazquez et al. | |

OTHER PUBLICATIONS

Coppola et al., "Social activity recognition on continuous RGB-D video sequences" (Year: 2020).*

(Continued)

*Primary Examiner* — Soo Jin Park
(74) *Attorney, Agent, or Firm* — Finnegan, Henderson, Farabow, Garrett & Dunner LLP (57) ABSTRACT

This disclosure relates to system and method for enabling a robot to perceive and detect socially interacting groups. Various known systems have limited accuracy due to prevalent rule-driven methods. In case of few data-driven learning methods, they lack datasets with varied conditions of light, occlusion, and backgrounds. The disclosed method and system detect the formation of a social group of people, or, f-formation in real-time in a given scene. The system also detects outliers in the process, i.e., people who are visible but not part of the interacting group. This plays a key role in correct f-formation detection in a real-life crowded environment. Additionally, when a collocated robot plans to join the group it has to detect a pose for itself along with detecting the formation. Thus, the system provides the approach angle for the robot, which can help it to determine the final pose in a socially acceptable manner.

11 Claims, 7 Drawing Sheets

(56) References Cited

OTHER PUBLICATIONS

Taylor et al., "Robot perception of human groups in the real world: state of the art" (Year: 2016).*

Yang et al., "Group behavior recognition using attention- and graph-based neural networks" (Year: 2020).*

Author: Sai Krishna Pathi, Annica Kristofferson, Andrey Kiselev and Amy Loutfil Title: Estimating Optimal Placement for a Robot in Social Group Interaction Title of the item: International Conference on Robot and Human Interactive Communication (RO-MAN) Date: 2019 Publisher: IEEE Link: http://oru.diva-portal.org/smash/get/diva2:1381356/FULLTEXT01.pdf.

Author: Sai Krishna Pathi Title: Join the Group Formations using Social Cues in Social Robots Title of the item: International Conference on Autonomous Agents and MultiAgent Systems Date: Jul. 2018 pp. 1766-1767 Publisher: ACM Link: https://www.mdpi.eom/2414-4088/3/4/69/htm.

Author: Sai Krishna Pathi Title: Join the Group Formations using Social Cues in Social Robots Title of the item: International Conference on Autonomous Agents and MultiAgent Systems Date: 2017 Publisher: Semantic Scholar Link: http://oru.diva-portal.org/smash/get/diva2:1178300/FULLTEXT01.pdf.

* cited by examiner

SYSTEM AND METHOD FOR ENABLING ROBOT TO PERCEIVE AND DETECT SOCIALLY INTERACTING GROUPS

PRIORITY CLAIM

This U.S. patent application claims priority under 35 U.S.C. § 119 to: India Application No. 202021026738, filed on Jun. 24, 2020. The entire contents of the aforementioned application are incorporated herein by reference.

TECHNICAL FIELD

The disclosure herein generally relates to robotic interactions, and, more particularly, to method and system for enabling robot to perceive and detect socially interacting groups.

BACKGROUND

Social robotics has gained exponential momentum in the recent years, which ensures that robots in social setups behave in an acceptable and safe way. Some of the interesting use cases of prevalent robotics applications are tele-presence robots, tele-operation robots, service robots, and co-worker robots in industries and household scenarios. In many such applications, robots often need to join a group of people for interaction. People in a group tend to maintain a pattern while they interact with each other. These patterns are based on some orientations and distances among the participating people. So, the robots should be well equipped with societal norms of joining existing groups for meetings and discussions.

SUMMARY

Embodiments of the present disclosure present technological improvements as solutions to one or more of the above-mentioned technical problems recognized by the inventors in conventional systems. For example, in one embodiment, a processor-implemented method for enabling a robot to perceive and detect socially interacting groups is provided. The method includes receiving, via one or more hardware processors, a video stream of a scene from an egocentric camera embodied in a robot, the video stream comprising a plurality of image frames. Further, the method includes identifying, via the one or more hardware processors, one or more groups of human subjects in the scene, wherein identifying comprises determining, using a deep learning-based model, a plurality of human body skeletons in the input images, and predicting a plurality of key-points for each of the plurality of human body skeletons. Further, the method includes associating, by the deep learning model, a plurality of confidence score with prediction of the plurality of key-points based on the orientation of a person of whom the human body skeleton is detected by the deep learning based model. Furthermore, the method includes selecting a plurality of features by categorizing the plurality of key-points with respect to the plurality of confidence scores into a plurality of labels, via the one or more hardware processors. Also, the method includes predicting, by a conditional random field (CRF) based probabilistic model, for each of the one or more groups, at least one of one or more members of the each group and one or more outliers of the each group, via the one or more hardware processors, the CRF model utilizing the plurality of features for predicting. Moreover, the method includes predicting, via the one or more hardware processors, an f-formation in the each group using a multi-class Support Vector Machine (SVM) with a Gaussian Radial Bias Function (RBF) kernel based on the at least one of one or more members of the each group. Also, the method includes predicting, via the one or more hardware processors, an approach angle of the robot to join the group using the multi-class SVM with the Gaussian RBF kernel.

In another aspect, a system for enabling a robot to perceive and detect socially interacting groups is provided. The system includes one or more memories; and one or more hardware processors, the one or more memories coupled to the one or more hardware processors, wherein the one or more hardware processors are configured to execute programmed instructions stored in the one or more memories to receive a video stream of a scene from an egocentric camera embodied in a robot, the video stream comprising a plurality of image frames. The one or more hardware processors are further configured by the instructions to identify one or more groups of human subjects in the scene, wherein identifying comprises determining, using a deep learning-based model, a plurality of human body skeletons in the input images, and predicting a plurality of key-points for each of the plurality of human body skeletons. Furthermore, the one or more hardware processors are configured to execute programmed instructions stored in the one or more memories to associate, by the deep learning model, a plurality of confidence score with prediction of the plurality of key-points based on the orientation of a person of whom the human body skeleton is detected by the deep learning based model. Also, the one or more hardware processors are configured to execute programmed instructions stored in the one or more memories to select a plurality of features by categorizing the plurality of key-points with respect to the plurality of confidence scores into a plurality of labels. Moreover, the one or more hardware processors are configured to execute programmed instructions stored in the one or more memories to predicting, by a conditional random field (CRF) based probabilistic model, for each of the one or more groups, at least one of one or more members of the each group and one or more outliers of the each group, the CRF model utilizing the plurality of features for predicting. Also, the one or more hardware processors are configured to execute programmed instructions stored in the one or more memories to predict an f-formation in the each group using a multi-class Support Vector Machine (SVM) with a Gaussian Radial Bias Function (RBF) kernel based on the at least one of one or more members of the each group. The one or more hardware processors are configured to execute programmed instructions stored in the one or more memories to predict an approach angle of the robot to join the group using the multi-class SVM with the Gaussian RBF kernel.

In yet another aspect, a non-transitory computer readable medium for a method for enabling a robot to perceive and detect socially interacting groups is disclosed. The method includes receiving, via one or more hardware processors, a video stream of a scene from an egocentric camera embodied in a robot, the video stream comprising a plurality of image frames. Further, the method includes identifying, via the one or more hardware processors, one or more groups of human subjects in the scene, wherein identifying comprises determining, using a deep learning-based model, a plurality of human body skeletons in the input images, and predicting a plurality of key-points for each of the plurality of human body skeletons. Further, the method includes associating, by the deep learning model, a plurality of confidence score with prediction of the plurality of key-points based on the orientation of a person of whom the human body skeleton is detected by the deep learning based model. Furthermore, the method includes selecting a plurality of features by categorizing the plurality of key-points with respect to the plurality of confidence scores into a plurality of labels, via the one or more hardware processors. Also, the method includes predicting, by a conditional random field (CRF) based probabilistic model, for each of the one or more groups, at least one of one or more members of the each group and one or more outliers of the each group, via the one or more hardware processors, the CRF model utilizing the plurality of features for predicting. Moreover, the method includes predicting, via the one or more hardware processors, an f-formation in the each group using a multi-class Support Vector Machine (SVM) with a Gaussian Radial Bias Function (RBF) kernel based on the at least one of one or more members of the each group. Also, the method includes predicting, via the one or more hardware processors, an approach angle of the robot to join the group using the multi-class SVM with the Gaussian RBF kernel.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Robots are expected to respect societal norms while joining a group like another human being during interactive sessions involving human beings. This may lead to more acceptability of a human towards a robot in social setups and would help a person in developing a certain level of confidence towards a robot. Getting social acceptance/trust and installing natural behavior or human like behavior for a robot is a non-trivial task. Typically, people in a group tend to maintain a pattern while they interact with each other. These patterns are based on some orientations and distances among the participating people. F-formations are social orientations in space where two or more people tend to communicate in a social place.

Typically, various compliances of social norms and rules are defined while a teleoperated robot (in telepresence scenario) is to join a group discussion or meeting remotely. Teleoperators of the robots generally follow F-formation and related social norms while navigating and joining interactions. It is observed that a more automated approach (than existing approaches) in the robot itself are desired to correctly navigate to the interaction scene and join the interaction optimally by detecting the F-formation and the types.

Figure 1A:
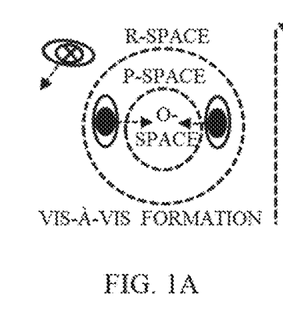
FIGS. 1A and 1B illustrate typical face-to-face (or vis-a-vis) and triangular (or triangle) f-formation, respectively, of a socially interacting group.
Figure 1B:
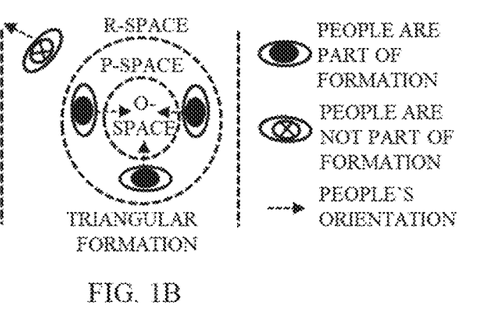

F-formation is used for formally defining a structure in social gathering where people interact among each other. The structures resemble certain geometric shapes like triangle, circle or square. F-formation generally consists of three major areas or spaces, which defines the intimacy level and societal norms of the interaction. In FIGS. 1A and 1B, a typical face-to-face (or vis-a-vis) and triangular (or triangle) f-formation respectively are depicted. The F-formation includes a p-space which is the area where the people stand in a patter, while o-space is where the standing people look towards, generally inwards towards each other, and the r-space is the area that lies outside them. Generally, people in the r-space are not considered as a part of the conversing group.

The existing methods to detect F-formations are mostly rule based. The accuracy of such systems in a dynamic environment is a challenge. Some known techniques use rule-based classifiers to detect F-formations with their types. These techniques use Haar classifier to detect faces in an image sequence and then divide the face into four quadrants. Then the eyes placement in the quadrants determine the orientation of the head whether the head is oriented left or right. This although doesn't give a very accurate orientation information but serves the purpose. Although this method works in real time with ego-centric camera setup, it is not tested with real robots in real interaction scenarios.

Another known technique uses a data-driven Machine Learning approach for F-formation detection. The technique trains and evaluates the model using data-sets with humans only. The technique deconstructs the frames of the data-set first and finds all possible pairs of people. Then these pair wise data with labels are fed into the model to classify if they are a part of any f-formation or not. And, finally the pair wise data are reconstructed into the full F-formation data. This method uses ego-centric camera vision in a real robot using Kinect visual sensor to perceive 3D human poses.

Another data-driven based Machine Learning approach is being used in a known technique. This approach is inspired by spatio-temporal aspects of any interaction/discussions among humans. They use a two-dimensional time series data (distances among participants over time and orientation of the participants over space and time). This sequence of images data is being used to train a LSTM based recurrent neural network (RNN). Ego-centric vision is used in the method and real-world scenarios are tested successfully with good accuracy.

Still another known technique utilizes a data-driven technique using Structural SVM. The technique employs correlation based clustering to assign pair of people into social interactions or groups. The orientation and distance parameters are used to decide the affinity of two people in a group or interaction. The technique also attends to the dynamics of interacting groups and the varying meanings of distances and orientations among people in different social setups by introducing a Structural SVM to learn the weight vectors of correlation clustering. The method has been tested with ego-centric datasets although not implemented in real robot. The technique is known to achieve real time response in detecting interactions.

Yet another known method gives a graph-cuts minimization based algorithm to cluster participants of a social setup into groups. The graph-cut finds the o-space in the group of people whose transactional segments (the area in front of any participant/robot/human where the sense of hearing and viewing is maximum) overlap. The transactional segments are identified by orientation of head, shoulder or feet. They have reported good results for most of the interaction scenarios in real time. Yet another known technique utilizes a new exo-centric method to track people's lower body orientation (dynamic Bayesian Network) and head pose detection based on their position and objects of interest in their interaction vicinity, after that group detection (Hough voting scheme) takes place for the participating people in the scene. They also use the concept of soft assignment of participants to o-spaces which in turn allows a much faster recovery from errors in group detection of low body orientation trackers. Visual focus of attention is an important cue in understanding social interaction quality and estimation. A known technique focuses on finding the Visual Focus of Attention (VFOA) of a person in 3D, and defines Subjective View Frustum (SVF) for the 3D representation.

Another known technique utilizes an Inter-Relation Pattern Matrix for capturing interactions between people in the scene. It uses a social scientific approach to analyze human proxemics and behaviors while discussions and interactions. The three main parameters being explored are individual, physical and psychological. HMMs are trained using two different feature representations: physical and psychological to identify spatio-temporal behaviors. The significance of these behaviors are marked as the starting and ending of a social interaction. The use of two different feature representations (physical and sensory experiences due to psychological features) helps in a more robust proxemics behavior representation for a robot to be deployed in social setups for interactions.

As is seen, the existing methods (including the aforementioned methods) to detect F-formations are mostly rule based. The accuracy of such systems in dynamic environment is challenging. Moreover, if the group is being viewed from such an angle that some parts of the group are occluded, then the existing methods do not perform in an acceptable manner. Secondly, the existing works estimate F-formation on the basis of head pose and orientation, which may result in wrong detection as someone might change his/her head orientation for a second and then again get back to his/her original orientation without changing the body orientation. So, the temporal information should also be taken into account in such dynamic cases.

A robot should join a social group which is in a meeting or interaction in a way that it does not hamper the meeting due to discomfort of the existing members of the group to the best. This effort combines robust human aware or socially aware navigation capabilities on one hand and finding the optimal point in a group interaction/F-formation to join and adjust successfully without much readjustment to be done by the co-participants. A study on the shapes/sizes of any interaction, mostly for a setup with two conversing person and an approaching robot, is based on the proximity of a person conversing with another person based on intimacy level (intimate, personal, social and public zones). Generally, people prefer a robot to join an interaction from directions between front-left (−30 to −40 degrees) and front-right (+30 to +40 degrees).

Although coming from direct front is acceptable but from the back is not at all acceptable. It is also understood that the most desirable stopping distances for a robot while approaching a human in interaction lies between 0.8 meters to 1.2 meters. This shows the need of smart human aware navigation and path planning strategy while joining group interactions. It has also been observed that a person's comfort shifts from one approach angle/direction to another depending on the presence and position of another person in a group. However, in such cases also front directions are preferred than back directions by a person for a robot to approach. Also presence of other people in a group decreases the person's sensitivity to robot's direction of approach.

A published study proposed a socializing model to achieve an optimal position while joining an interaction. The study takes into account holonomic and non-holonomic motions for a robot while doing experimentation. The study talks about three criteria to achieve social acceptance for a robot to join an interaction: Trust, Engagement and Compliance. The study reveals that the holonomic or omnidirectional motion robots displays better naturalness and engagement hence the awkwardness of the participants due to the robot joining the interaction is less. This leads to a more socially compliant and acceptable behavior from the robot. The study also reveals that non-real timeliness in computational activities (navigational goals) can lead to negative impact about the overall impression of the robot. The experiments are carried out using ego-centric camera and geometry.

Another study points out the benefit of addressing gesture, speech and social cues together with intelligent navigation. That means human aware navigation and positioning in an environment where people move from point to point while interaction is important and non-trivial. The study uses topological map and state diagram for the navigational tasks and the subtasks which constitute the defined tasks. The experimental results show the robotic platform moves naturally while in interaction.

Yet another study on Rayleigh's test shows that the people or a pair of participants feel most comfortable while a robot approaches if they both can see it coming at the same time. The most optimum joining point is the center of the largest unoccupied area in p-space already formed by the participants. A work talks about bringing natural approaching behavior of a human in a robot while it navigates towards an interaction. There is an Action Planner (AP) that plans human friendly approach direction and termination point. The skeletal information (from Kinect sensor) of the humans are input to the AP. The Navigation Controller (NC) looks after the navigational information as perceived from the environment by the robot. The experimental results show that the method is capable of displaying user friendly approach and navigational strategies by the robot. The human satisfaction level achieved is quite high.

An interesting study for robot navigation and joining a group is finding the distances between robot and the group. Many sensors are there to do that, but accuracy is less, and computational cost and memory requirements are high. Moreover, most of the methods require an exocentric view of the scene to estimate the distances, such as in ego view occlusion and body pose and orientation plays a non-trivial role. The above cited paper gives a method to find distance between a robot (which has the camera as his eye) and the people in the group using ego view from images. The method uses 2D pose estimation and finds the Euclidean distance between ear and torso of the skeleton of the person. The relative distance between these two points gives an approximate estimation of the distance between the camera and person. The method displays effective distance estimations from low resolution images even in the case of partial occlusion and cluttered background.

Yet another known technique gives a geometric method to optimally place a robot in a social group interaction by determining the o-space by f-formation theory. The method used in this paper assumes that, distance between people and robot is known, orientation of people w.r.t. robot is known, egocentric view is transferred to top-down view, the scene has only one group. Experimentation have shown that teleoperators of the robot prefer automatic placement of the robot in an interaction rather than manually placing it by themselves and the optimal placement positions given by this method mostly corresponds to what the operators would have chosen. A known technique uses a deep reinforcement learning based method to model robot's approaching behavior towards a group of people in interaction using simulations. The model is tested in real world with small group of people using some subjective and objective parameters along with user study.

Various embodiments disclose method and system for robot placement in group interactions in a manner that takes care of the aforementioned and other limitations known in the art. For example, in an embodiment, the disclosed method includes a machine learning based method to detect social groups of people. The disclosed system utilizes a deep learning model to detect a plurality of key points in a skeleton of a human body of all the person (humans) in a scene. Based on the plurality of key points, the system devise classifiers which take into account the confidence value of each of the key points for training. The system further creates a data-set using a camera mounted on a robot for four real life formations, namely, face-to-face, side-by side, L-shaped, and triangular from various angles and distances.

In an embodiment, the system detects social groups and the probable outliers in a scene. The system enables forming of clusters of people into group and then finds the group are considered for F-formation detection. The system detects the social groups of people in a scene by avoiding outliers using our own CRF probabilistic model, thereby helping to detect who are part of the same p-space.

In an embodiment, the disclosed system includes a robust real-time F-formation detection system that is employed to receive inputs from a pre-processing model of group of interest detection in a scene by avoiding outliers, thereby suiting it for robotic applications. The system incorporates a robust and highly accurate multiclass SVM based f-formation classifier. An important technical advantage of the disclosed system is that it is not hampered due to the outliers in the scene. The system is further configured to determine an approach angle for the detected F-formation, i.e., the F-formation's orientation with respect to the robot or vice versa. These and various other embodiments of the disclosed method and system are further explained with reference to the description below.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 2 through 9B, where similar reference characters denote corresponding features consistently throughout the figures, there are shown preferred embodiments and these embodiments are described in the context of the following exemplary system and/or method.

Figure 2:
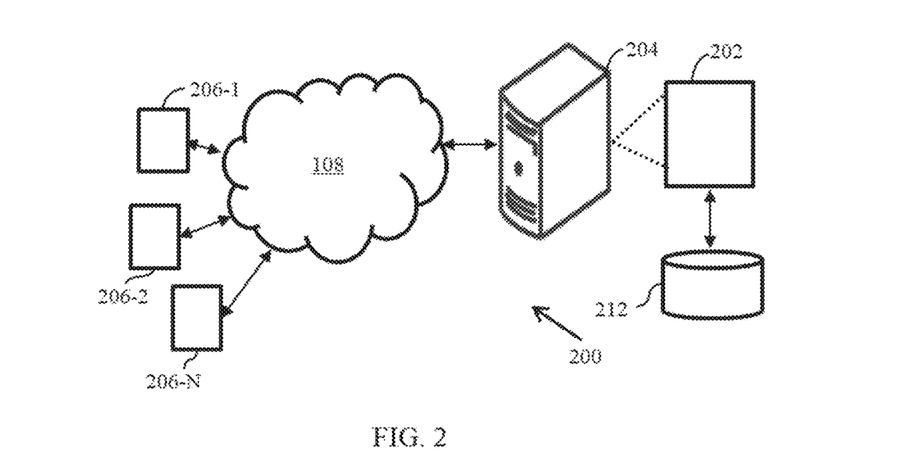
FIG. 2 illustrates an example network implementation of a system for enabling a robot to perceive and detect socially interacting groups in accordance with an example embodiment.

FIG. 2 illustrates an example network implementation 200 of a system 202 for enabling a robot to perceive and detect socially interacting groups in accordance with an example embodiment. In an embodiment, the system 202 facilitates in predicting social groups and corresponding F-formations in general and by doing that indirectly detecting human social groups/interactions in a given scene. In an embodiment, the system 202 detects the angle/orientation of the formation itself so as to understand where should a robot navigate to join the interaction optimally in a socially acceptable way respecting the societal norms.

In an embodiment, the system 202 first clusters humans in a scene into socially interacting groups based on some spatial and orientation features. It also detects outlies in the scene to exclude them from groups. Thereafter, the system 202 finds the F-formation type for each of the detected groups from the previous component. Moreover, it also detects the orientation of the F-formation with respect to the viewing camera (the robot) or the approach angle. This approach angle helps in estimating the optimal pose of the robot to join the group of people.

Although the present disclosure is explained considering that the system 202 is implemented on a server, it may be understood that the system 202 may also be implemented in a variety of computing systems 204, such as a laptop computer, a desktop computer, a notebook, a workstation, a cloud-based computing environment and the like. It will be understood that the system 202 may be accessed through one or more devices 206-1, 206-2 . . . 206-N, collectively referred to as devices 206 hereinafter, or applications residing on the devices 206. Examples of the devices 206 may include, but are not limited to, a portable computer, a personal digital assistant, a handheld device, a Smartphone, a tablet computer, a workstation and the like. The devices 206 are communicatively coupled to the system 202 through a network 208.

In an embodiment, the network 208 may be a wireless or a wired network, or a combination thereof. In an example, the network 208 can be implemented as a computer network, as one of the different types of networks, such as virtual private network (VPN), intranet, local area network (LAN), wide area network (WAN), the internet, and such. The network 206 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 208 may include a variety of network devices, including routers, bridges, servers, computing devices, storage devices. The network devices within the network 208 may interact with the system 202 through communication links.

As discussed above, the system 202 may be implemented in a computing device 204, such as a hand-held device, a laptop or other portable computer, a tablet computer, a mobile phone, a PDA, a smartphone, and a desktop computer. The system 202 may also be implemented in a workstation, a mainframe computer, a server, and a network server. In an embodiment, the system 202 may be coupled to a data repository, for example, a repository 212. The repository 212 may store data processed, received, and generated by the system 102. In an alternate embodiment, the system 202 may include the data repository 212.

The network environment 200 supports various connectivity options such as BLUETOOTH®, USB, ZigBee and other cellular services. The network environment enables connection of devices 206 such as Smartphone with the server 204, and accordingly with the database 212 using any communication link including Internet, WAN, MAN, and so on. In an exemplary embodiment, the system 202 is implemented to operate as a stand-alone device. In another embodiment, the system 202 may be implemented to work as a loosely coupled device to a smart computing environment. The components and functionalities of the system 202 are described further in detail with reference to FIGS. 3-6.

Figure 3:
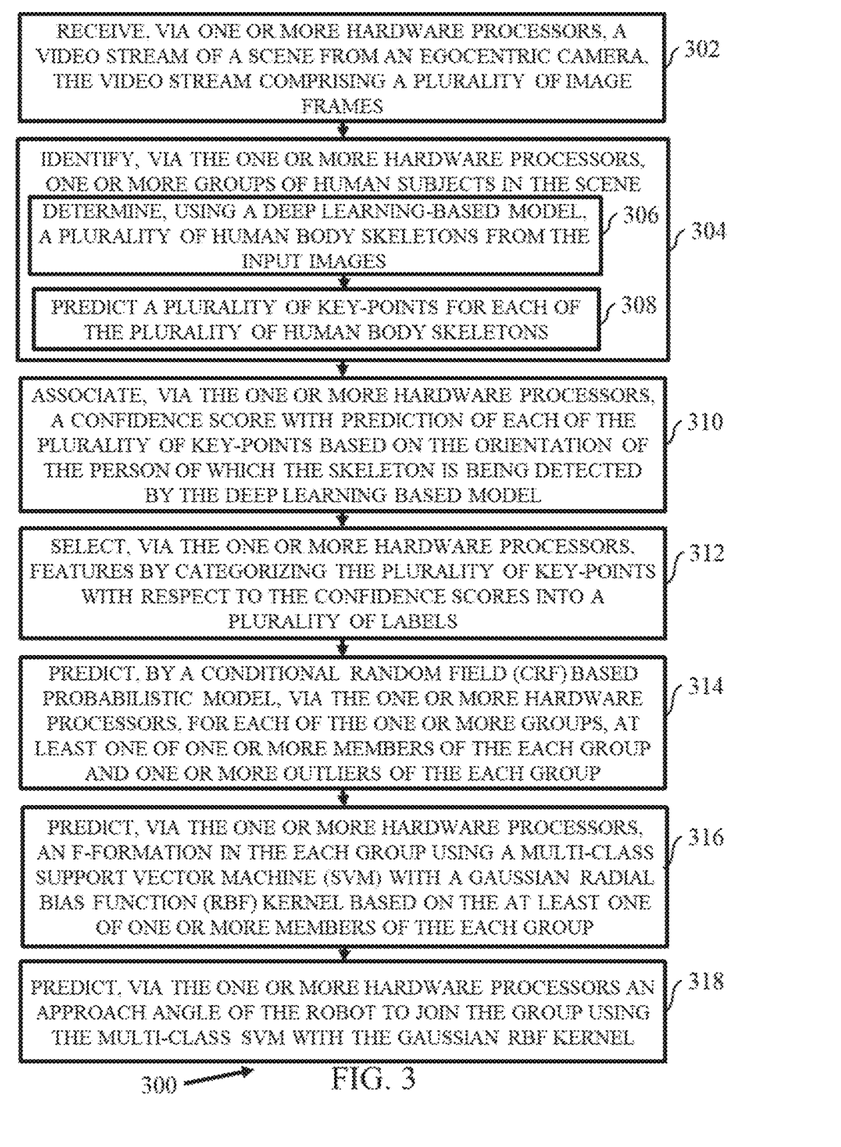
FIG. 3 is a flow diagram of a method for enabling a robot to perceive and detect socially interacting groups according to some embodiments of the present disclosure.
Figure 4:
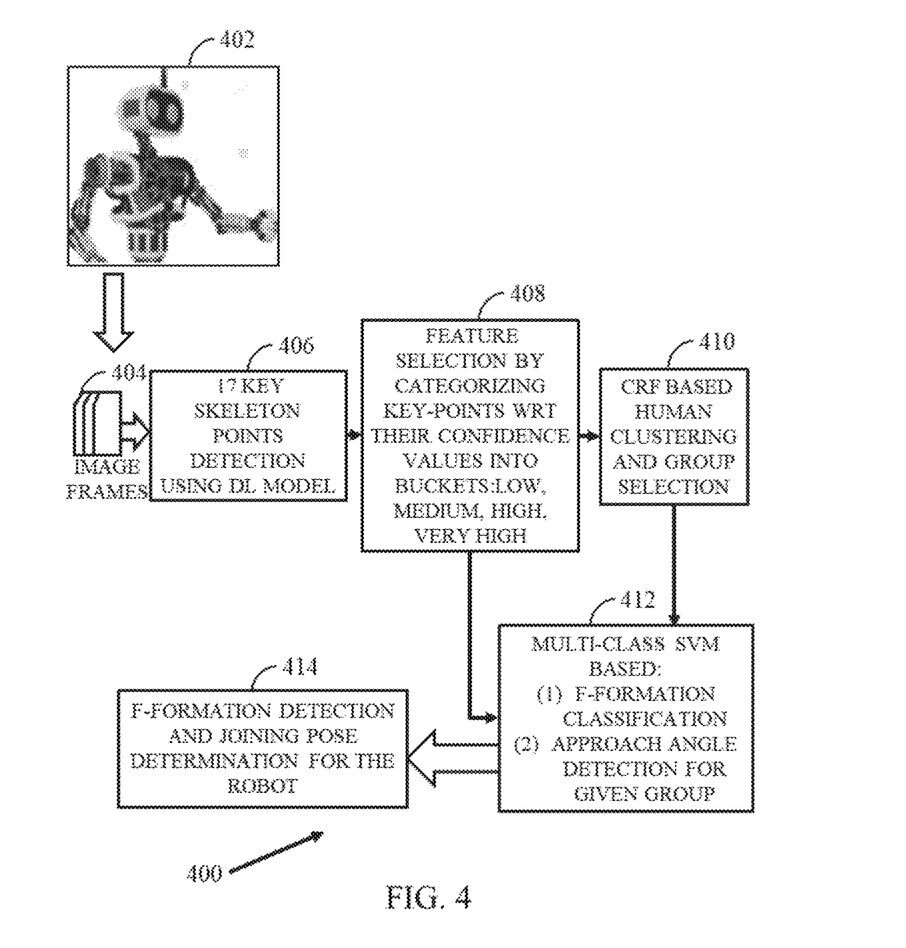
FIG. 4 illustrate a process flow diagram of a method for enabling a robot to perceive and detect socially interacting groups, according to some embodiments of the present disclosure.
Figure 5A:
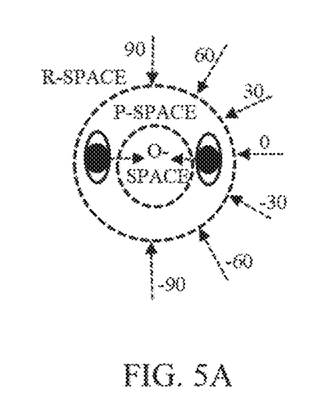
FIGS. 5A-5D illustrates an approach/joining angle layout map utilized for leaning models corresponding to a face-to-face formation, a side-by-side formation, a L-shaped formation, and a triangle formation, respectively, according to some embodiments of the present disclosure.
Figure 5B:
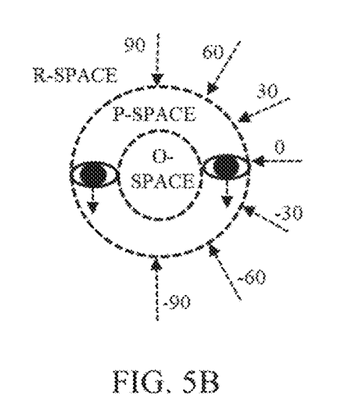
Figure 5C:
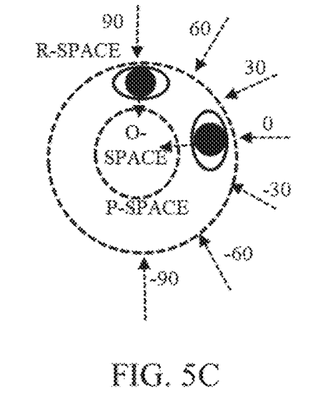
Figure 5D:
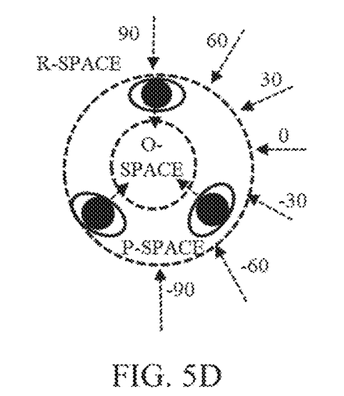
Figure 6:
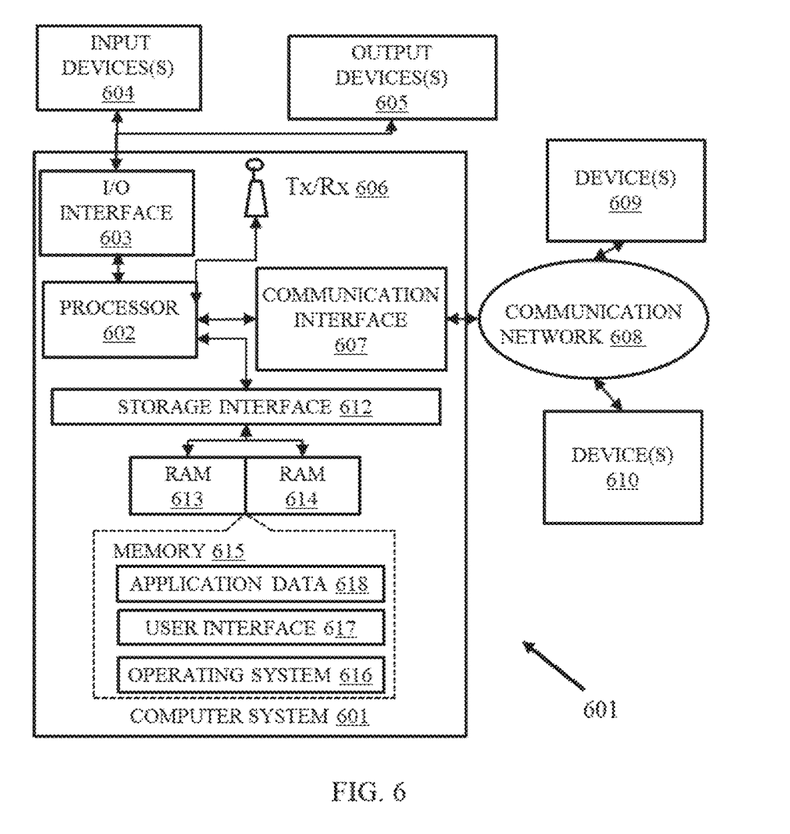
FIG. 6 is a block diagram of an exemplary computer system for implementing embodiments consistent with the present disclosure.
Figure 7A:
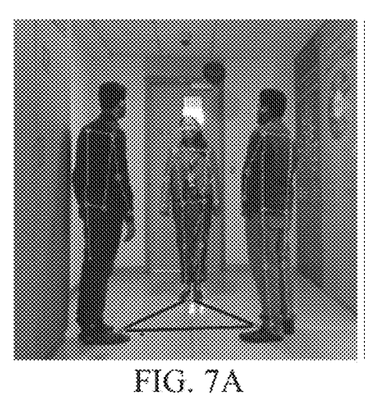
FIGS. 7A-7D illustrate example of people standing in Triangle, L-shaped, Side-by-side and Face-to-face f-formations, respectively from −90 approach angle with black marks in the floor to define the formation, according to some embodiments of the present disclosure.
Figure 7B:
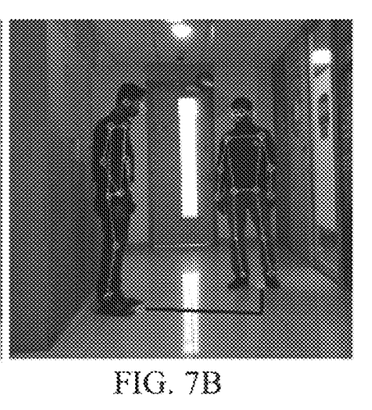
Figure 7C:
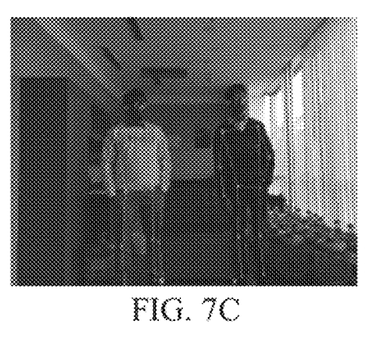
Figure 7D:
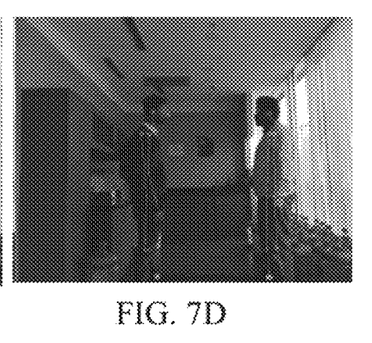

For example, FIG. 3 is a flow diagram of a method 300 for enabling a robot to perceive and detect socially interacting groups according to some embodiments of the present disclosure. FIG. 4 illustrate a process flow diagram 400 of a method for enabling a robot to perceive and detect socially interacting groups. FIGS. 5A-5D illustrates an approach/joining angle layout map utilized for leaning models corresponding to a face-to-face formation, a side-by-side formation, a L-shaped formation, and a triangle formation, respectively, according to some embodiments of the present disclosure. FIG. 6 is a block diagram 601 of an exemplary computer system for implementing embodiments consistent with the present disclosure.

Referring collectively to FIGS. 3-6, the method for enabling a robot to perceive and detect socially interacting groups is described. The disclosed method enables detection of groups and human clustering avoiding outliers and F-formation detection with the type (classification) and approach angle prediction for enabling the robot to perceive and detect socially interacting groups. The method 300/400 depicted in the flow chart/process flow diagram may be executed by a system, for example, the system, 202 of FIG. 2. In an example embodiment, the system 202 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 300 are described with help of system 202. However, the operations of the method 300 can be described and/or practiced by using any other system.

At 302, the method 300 includes receiving a video stream of a scene from an egocentric camera. In an embodiment, the egocentric camera may be embodied in a robot, for example, a robot 402 (FIG. 4). The video stream may include a plurality of image frames (e.g. images 404 of FIG. 4) of the scene. Herein, the scene may include various human subjects in groups. Additionally or alternatively the scene may include some human subjects that may or may not be a part of the group/groups.

At 304, the method 300 includes identifying one or more groups of human subjects in the scene. To detect groups in a scene, firstly, the method facilitates in detecting all the people in the scene and their corresponding body orientation. Then, a relationship of each of the persons with another one in the scene is determined. The method for identifying the one or more groups in the scene is explained further with reference to 306-308. For example, at 306, the method 300 includes determining, using a deep learning-based model, a plurality of human body skeletons from the input images. At 308, the method 300 includes predicting a plurality of key-points for each of the plurality of human body skeletons. In an embodiment, a deep learning-based model, for example, Posenet™ may be utilized to detect multi-person body skeleton and provide a number of key points corresponding to each person. As Posenet™ is a lightweight and highly accurate model, we use it to achieve real-time f-formation detection. As illustrated at 406 (FIG. 4) Posenet™ may yield 17 key points (with co-ordinates) of a human skeleton. The skeleton includes the following human body points—nose, leftEye, rightEye, leftEar, rightEar, leftShoulder, rightShoulder, leftElbow, rightElbow, leftWrist, rightWrist, leftHip, rightHip, leftKnee, rightKnee, leftAnkle, and rightAnkle. Then these key-points are utilized to find the individual and relative orientation of the people, which leads to f-formation detection.

At 310, the method 300 includes assigning/associating a confidence score with prediction of each of the plurality of key-points based on the orientation of the person of which the skeleton is being detected by the deep learning-based model. In an embodiment, the deep learning-based model may be capable of assigning a confidence score to key-points. In an embodiment, the confidence score may range between 0 to 1.

At 312, the method 300 includes selecting features by categorizing the plurality of key-points with respect to the confidence scores into a plurality of labels. In an embodiment, the features may be selected by assigning four labels to each of these key points based on their confidence value (as shown at 408, FIG. 4). For example, the plurality of key-points may be categorized by assigning one of four labels to each of these key points based on their confidence value, where the four labels may be 'Low' corresponding to confidence score of O-0.25, 'Medium' corresponding to confidence score of O.25-0.5, 'High' corresponding to confidence score of O.5-0.75, and 'Very high' corresponding to confidence score of 0.75-1. The list of key point coordinates along with their labels are utilized as feature vector for the classifiers.

At 314, the method 300 includes predicting, for each of the one or more groups, at least one of one or more members of the each group and one or more outliers of the each group. In an embodiment, the member of the group and the outliers may be determined by applying a conditional random field (CRF) based probabilistic model. The CRF based probabilistic model formulates feature functions to predict whether the detected people in a scene are a part of a group or not, as shown at 410 (FIG. 4). Herein, the people who are not a part of the group are referred to as 'outliers' (as shown in FIGS. 1A and 1B).

The label marking based on the confidence value is to create the feature vector. The confidence value of a key point is dependent on the orientation of the person of which the skeleton is being detected by the deep learning-based model. Moreover, the location of the corresponding key points of two people can vary significantly based on their closeness or distance between them in the scene. Such features may be selected for CRF to detect social groups and outliers in a scene.

Given a left-to-right sequence of 2d-poses $p_1, p_2, \ldots, p_n$, of the people present in an image, a CRF is used to predict a sequence of group membership label, $g_1, g_2, \ldots, g_n$, where $g_i \in G, O$, where G and O denotes a person in a group and an outlier, respectively. The CRF based probabilistic model is represented by equation (1) as:

$$P(g_{1:n}|p_{1:n}) = \alpha \exp\{\Sigma_{i=0}^{n}\Sigma_{j=0}^{k}\lambda_j f_j(p_{i-1}, p_i, p_{i+1}, g_{i-1}, g_i)\} \quad (1)$$

Each node of the CRF uses observation feature functions $f_j$ defined over the current pose and its left and right neighbors, k is the number of such features functions, including a transition feature and is the normalization factor.

At 316, the method 300 includes predicting an f-formation in the each group using a multi-class Support Vector Machine (SVM) with a Gaussian Radial Bias Function (RBF) kernel based on the at least one of one or more members of the each group. The multi-class SVM with the Gaussian RBF kernel is utilized both for the prediction of the f-formation and approach angle, as shown at 412 (FIG. 4). The Gaussian RBF kernel minimizes a weighted squared Euclidean distance between the feature vectors of two arbitrary samples $X_i$, $X_j$, i.e.

$$K(X_i, X_j) = \exp{-\gamma\|X_i - X_j\|^2}; \quad (2)$$

and where the free parameter $\gamma$ is learnt from a training data.

At 318, the method 300 includes predicting an approach angle of a viewing robot to join the group using the multi-class SVM with the Gaussian RBF kernel. Given a set of person-poses after the filtering by the group and outlier detection module, the SVM classifier is utilized for predicting the f-formation and based on this prediction, an approximate approach angle is predicted, as shown at 414 (FIG. 4). In an embodiment, same feature vector may be used for both the prediction. In an embodiment, for approach angle prediction, the output of the f-formation classifier is used as an additional feature and also it is filtered based on the set of people who belong to the same group. In another embodiment, the f-formation and the approach angle are jointly predicted in a single classifier and show its efficacy against a baseline approach.

In an example, some angles may be considered from which the formation is being viewed by the robot. Such angles may include, but are not limited to, −0°, 30°, 60°, 90°, −30°, −60° and −90°. The prediction may reveal the orientation of the formation, thus the joining angle for the robot can be estimated.

FIGS. 5A-5D illustrates an approach/joining angle layout map utilized for leaning models corresponding to a face-to-face formation, a side-by-side formation, a L-shaped formation, and a triangle formation, respectively. Herein, a complete set of angles is considered for a robot that covers the major part of the formations. Herein, −90° is considered to be the angle/direction which is the optimal angle for a robot to join the formation (in case of L-shaped and triangle) and −90° as well as 90° in case of face-to-face and side-by-side depending on the situation. So, if the robot detects the formation from any other angle than −90° and 90° (as per the formation), it can move to either left or right direction towards a −90° or 90° angle (as per the formation and situation) and then it can move forward to join the group using some conventional distance estimation method and a conventional stopping criteria.

The Face-to-face formation (FIG. 5A), is symmetrical, and therefore the same joining angle can be considered for the −90°, −60°, −30°, and 0° angles and their symmetrical angles. As for the side-by-side formation (FIG. 5B), both the below 0° and above 0° angles are non-symmetric. Here also the remaining semi-circle is irrelevant as its symmetric. For FIG. 5C, which shows the L-shaped formation, the entire set of angles are relevant due to its non-symmetric nature. For the triangle formation in FIG. 5D same argument holds tight.

FIG. 6 is a block diagram of an exemplary computer system 601 for implementing embodiments consistent with the present disclosure. The computer system 601 may be implemented in alone or in combination of components of the system 202 (FIG. 2). Variations of computer system 601 may be used for implementing the devices included in this disclosure. Computer system 601 may comprise a central processing unit ("CPU" or "hardware processor") 602. The hardware processor 602 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 602 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc. The processor 302 may be a multi-core multi-threaded processor.

Processor 602 may be disposed in communication with one or more input/output (I/O) devices via I/O interface 303. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a communication interface 607. The communication interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the communication interface 607 and the communication network 608, the computer system 601 may communicate with devices 609 and 610. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 602 may be disposed in communication with one or more memory devices (e.g., RAM 513, ROM 514, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of programs or database components, including, without limitation, an operating system 616, user interface application 617, user/application data 618 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 601 may store user/application data 618, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, (the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

Example Scenario:

In an example scenario, the disclosed system was evaluated on two aspects, namely, the CRF probabilistic model for group and outlier detection and the multi-class SVM model with a radial bias function (RBF) kernel for f-formation detection and approach angle prediction. The accuracy of f-formation detection was compared with a rule-based state-of-the-art system. Since multiple group detection and approach angle detection was not done by any existing literature, it could not be compared it with existing systems.

In the present example, for the training and testing of the models, two sets of data—the EGO-GROUP2 dataset and a locally collected dataset were utilized. The EGO-GROUP dataset contains a total of 2900 frames annotated with groups. In different frames, around 19 different human subjects were used. And 4 different scenarios were considered to make it more challenging for detection. The dataset considers a laboratory setting, a coffee break setting, a festive scenario and an outdoor scenario. All these scenarios have different levels of background clutter, lighting conditions and settings.

A local dataset of four common f-formations—face-to-face, L-shaped, side-by-side, and triangle was created. An example of the four f-formation, namely face-to-face, L-shaped, side-by-side, and triangle are illustrated in FIGS. 7A-7D. For each of these formations, the data was collected using 4 different subjects from 7 different angles -0°, 30°, 60°, 90°, -30°, -60° and -90° as shown in FIGS. 5A-5D. Moreover, for every formation and every angle, data was collected from different distances from the center of the o-space ranging from 2 meters to 5 meters. Further, considered different lighting conditions, backgrounds, partial occlusion, and cluttered background were considered while collecting the data. The dataset consists of 4692 image frames in total, which were annotated with the four formations and the approach angles. The images were collected from a video stream using a RealSenes™ camera mounted on a Double2™ robot. An 80%-20% split (for each formation) of the dataset was done for training and testing correspondingly. The experiments were conducted with a single core CPU with 8 GB RAM (even lower memory is fine) without any graphics processing units (GPU). Thus, the system can be run on any embedded system or robotic hardware.

The CRF model for group and outlier detection was trained and tested using a subset of the EGO-GROUP dataset which contains 969 image frames, with an average of 3.6 persons per frame, where an 80-20% split of data was used for training and testing. Only those frames were selected that contained the four f-formations and outliers to make the subset. The system displayed an average accuracy of 91% in detecting the outlier, that were not part of the interacting group. Table I shows the evaluation metrics for the two membership classes.

TABLE I

Results for the prediction of group membership sequence given the sequence of 2D poses.

| Group membership | Precision | Recall | F1 |
| --- | --- | --- | --- |
| Group | 0.92 | 0.92 | 0.92 |
| Outlier | 0.89 | 0.89 | 0.89 |
| Average | 0.91 | 0.91 | 0.91 |

By analyzing the failure cases, it was determined that the classifier makes error in some frames where the outlier is in close proximity of the group and also has a very similar orientation. However, this can be mitigated by introducing temporal information in the classification. Overall, the detection of social groups before the prediction of f-formation should contribute to the robustness of the system.

Herein, the encoded skeletal key points vector were used to train a multi-class SVM classifier for f-formation detection. The accuracy of the disclosed system was compared with the state-of-the-art (rule-based) method. Table II summarizes the prediction accuracy of these two methods.

TABLE II

F-formation prediction results for our method (learning based) and rule based method.

| F-formation | Precision | Recall | F1 | Rule based methods |
| --- | --- | --- | --- | --- |
| face-to-face | 0.99 | 0.99 | 0.99 | 0.68 |
| side-by-side | 0.95 | 0.99 | 0.97 | 0.94 |
| L-shaped | 1 | 0.96 | 0.98 | 0.49 |
| triangle | 1 | 1 | 1 | 0.63 |
| Average | 0.98 | 0.98 | 0.98 | 0.69 |

Since the state-of-the-art system is originally tested for only a limited approach angles, i.e., -90° and 90° for face-to-face, only -90° for side-by-side, and only -90° for L-shaped and finally -90° and +90° for triangle, this table represents the accuracy for the subset of data with these approach angles only. It is evident that the disclosed system improves the accuracy significantly (98% as compared to 69%) and achieves a near perfect accuracy for all the formations with these approach angles. The main reason is that the rule-based method considers only head pose orientation features such as eyes and ears for writing the rules. The head pose/orientation detection is also limited to left, right and front direction prediction for the rule based, hence limiting its formation detection capability to a great extent. However, in the disclosed learning based SVM method, full body orientation features were considered as given by skeletal key points (e.g., Posenet™ DL model) and not limited to a fixed number of orientations. This also contributes to its spike in accuracy compared to the other method. Also, the rule-based method doesn't take into account partial occlusion and so it fails if the head and its features are not visible partially whereas the disclosed method overcomes that situation through rigorous learning.

The approach angle detection is necessary to understand the orientation of the F-formation with respect to the detecting camera/robot. This facilitate efficient navigation of the robot/device to join the formation at an appropriate spot. The Table III reports the result of approach angle prediction (Precision, Recall and F1-score) for any F-formation using the learning-based method.

TABLE III

Approximate approach angle prediction results

| Approximate angle | Precision | Recall | F1 |
| --- | --- | --- | --- |
| -90° | 0.93 | 0.98 | 0.95 |
| -60° | 0.98 | 0.95 | 0.96 |
| -30° | 0.98 | 0.99 | 0.98 |
| 0° | 0.94 | 0.99 | 0.97 |
| 30° | 0.97 | 0.89 | 0.93 |
| 60° | 0.93 | 0.94 | 0.94 |
| 90° | 0.97 | 0.95 | 0.96 |
| Average | 0.96 | 0.96 | 0.96 |

The results show an acceptable accuracy of 96% for approach angle prediction alone. The conventional rule based method has not considered approach angle prediction along with F-formation using their rule based classifier as its head pose/orientation detection rules displays limited capability in detecting formations. However, we similar rules have been used to implement the rule based method. So, these two methods were compared among themselves in Table IV. The table contains the combined results for F-formation and approach angle prediction. As can be seen, the disclosed learning based method has outperformed our rule based method (similar to the conventional rule based method) with high margin. A difference of 55% in overall accuracy establishes the efficacy of the disclosed learning based method over rule based counterpart.

Figure 8A:
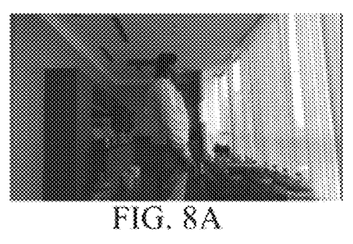
FIGS. 8A-8B illustrate examples of occlusion of one person in a Side-by-side and Face-to-face formations, respectively according to some embodiments of the present disclosure.
Figure 8B:
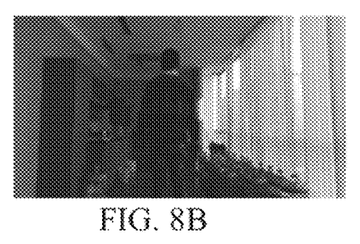
Figure 8C:
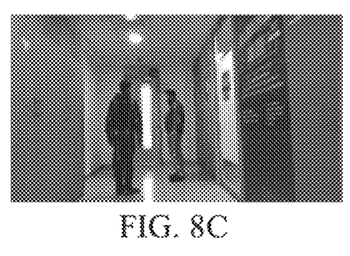
FIGS. 8C-8D illustrate examples of occlusion of one person in Triangle formations according to some embodiments of the present disclosure.
Figure 8D:
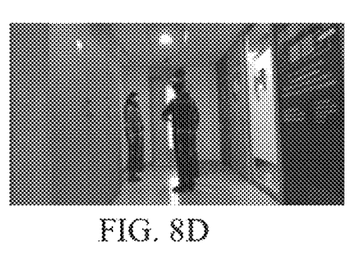
Figure 9A:
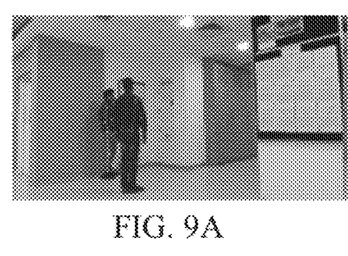
FIGS. 9A-9B illustrate examples L-shaped formations (30 and 90 degrees respectively) where misclassifications have taken place to a great extent predicting them as side-by-side or face-to-face.
Figure 9B:
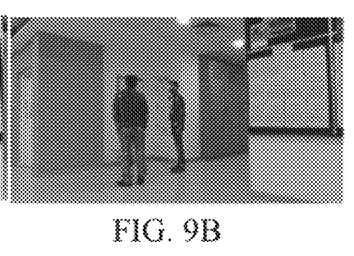

The Table IV illustrates some interesting results. Some of the highlighted (as bold) rows gives those formation with approach angle where rule-based method failed completely. For side-by-side 0 and face-to-face 0 (see FIG. 8A and FIG. 8B), the person nearer to the camera occludes the other person in formation highly. So, rule-based method, where only head pose orientation along with eyes and ears position is considered, fails in this case. But in the disclosed learning model, since entire human body pose features are used for prediction (not simply relying on the head pose, orientation and eye/ear positions) it gives excellent results. The triangle −30 and triangle 30 have similar occlusions of one of the members of the formation, hence the failure in rule-based method (see FIG. 8C and FIG. 8D). However, in these two cases misclassifications have taken places more than 50% of times, predicting them as face-to-face, side-by-side or L-shaped in some cases due to occlusion of one member. This is clearly shown in the four cases of FIGS. 8A-8D. The other cases with very low accuracy have similar reasons of occlusions and/or miss-classifications in rule based method. The FIGS. 9A and 9B show two cases of L-shaped formation where misclassifications have taken place to a great extent predicting them as side-by-side or face-to-face.

The italicized rows below gives the cases where the rule based method outperforms the learning based method. These are roughly the cases where the rules best suites the conditions. These angles of viewing the F-formations are the best case scenarios for the rule based classifier. The other such cases where the rule based method have quite high accuracy is pertaining to the same fact. There is a decline of 6% in accuracy of our learning based method while considering approach angle is due to the lesser number of training data samples when the dataset is divided among various approach angles for the different formations.

TABLE IV

Accuracy of the joint prediction of F-formation and approach angle.

| F-formation and angle | Disclosed learning based method (joint prediction accuracy for f-formation and approach angle) | State-of-the-art (prediction accuracy for only f-formation) |
| --- | --- | --- |
| face-to-face −90 | 80% | 54% |
| face-to-face −60 | 86% | 43% |
| face-to-face −30 | 96% | 45% |
| face-to-face 0 | 100% | 0% |
| face-to-face 30 | 98% | 22% |
| face-to-face 60 | 95% | 3% |
| face-to-face 90 | 70% | 82% |
| side-by-side −90 | 91% | 94% |
| side-by-side −60 | 82% | 96% |
| side-by-side −30 | 88% | 86% |
| side-by-side 0 | 96% | 0% |
| side-by-side 30 | 83% | 21% |
| side-by-side 60 | 88% | 2% |
| side-by-side 90 | 97% | 2% |
| L-shaped −90 | 99% | 49% |
| L-shaped −60 | 98% | 29% |
| L-shaped −30 | 82% | 6% |
| L-shaped 0 | 90% | 25% |
| L-shaped 30 | 81% | 10% |
| L-shaped 60 | 93% | 30% |
| L-shaped 90 | 83% | 1% |
| triangle −90 | 97% | 48% |
| triangle −90 | 100% | 56% |
| triangle −30 | 90% | 0% |
| triangle 0 | 100% | 56% |
| triangle 30 | 100% | 0% |
| triangle 60 | 99% | 91% |
| triangle 90 | 97% | 78% |
| Average | 92% | 37% |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments discloses method and system for enabling a robot to perceive and detect socially interacting groups in an accurate manner. The system and method makes the robot respect societal norms in joining a group like another human being, thereby leading to more acceptability of a human towards a robot in social setups and would help a person in developing a certain level of confidence towards a robot. In an embodiment, the disclosed method detects the formation of a social group of people, namely, f-formation in real-time in a given scene. The system also detect outliers in the process, i.e., people who are visible but not part of the interacting group. This plays a key role in correct f-formation detection in a real-life crowded environment. Additionally, when a collocated robot plans to join the group it has to detect a pose for itself along with detecting the formation. Thus, the system determines the approach angle for the robot, which can help the robot to determine the final pose in a socially acceptable manner. The system is more accurate than known systems and techniques, since the known systems and methods are rule-driven. In the case of a few data-driven learning methods, they lack datasets with varied conditions of light, occlusion, and backgrounds. The disclosed system however facilitates creation of a dataset for the requisite purpose. The disclosed method of jointly detecting formation orientation and approach angle for a robot is not addressed in any of the existing systems/method. The results show that the group and outlier detection in a scene using the disclosed method establishes an accuracy of 91%. The comparison of the disclosed system with existing system have revealed that it outperforms the state-of-the-art by 29% for formation detection and 55% for the formation and approach angle combined detection.

As an extrapolation of the practical application of the disclosed system, it can be utilized by using the robot for monitoring social distancing norms that may be followed/violated by individual in a group setting.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, via one or more hardware processors, a video stream of a scene from an egocentric camera embodied in a robot, the video stream comprising a plurality of image frames;
identifying, via the one or more hardware processors, one or more groups of human subjects in the scene, wherein identifying the one or more groups comprises:
determining, using a deep learning-based model, a plurality of human body skeletons in the input images; and
predicting a plurality of key-points for each of the plurality of human body skeletons;
associating, by the deep learning model, a plurality of confidence scores with the plurality of key-points, wherein a confidence score from amongst the plurality of confidence scores is associated with a key-point from amongst the plurality of key-points based on an orientation of a person of whom the human body skeleton is detected by the deep learning based model;
determining a plurality of features by categorizing the plurality of key-points with respect to the plurality of confidence scores into a plurality of labels, via the one or more hardware processors;
predicting, by a conditional random field (CRF) based probabilistic model, for each group of the one or more groups, at least one of one or more members of the each group and one or more outliers of the each group, via the one or more hardware processors, the CRF model utilizing the plurality of features;
predicting, via the one or more hardware processors, an f-formation in the each group using a multi-class Support Vector Machine (SVM) with a Gaussian Radial Bias Function (RBF) kernel based on the at least one of one or more members of the each group; and
predicting, via the one or more hardware processors, an approach angle of the robot to join the group using the multi-class SVM with the Gaussian RBF kernel.

2. The method of claim 1, wherein the plurality of key points on a human body skeleton from amongst the plurality of human body skeletons comprises nose, leftEye, rightEye, leftEar, rightEar, leftShoulder, rightShoulder, leftElbow, rightElbow, leftWrist, rightWrist, leftHip, rightHip, leftKnee, rightKnee, leftAnkle, and rightAnkle.

3. The method of claim 1, wherein categorizing the plurality of key-points comprises assigning one of four labels to each of these key points based on their confidence value, the four labels comprises low corresponding to confidence score of 0-0.25, a medium corresponding to confidence score of 0.25-0.5, high corresponding to confidence score of 0.5-0.75, and very high corresponding to confidence score of 0.75-1.

4. The method of claim 1, wherein the CRF based probabilistic model is represented as:

$$P(g_{1:n}|p_{1:n}) = \alpha \exp\{\Sigma_{i=0}^{n} \Sigma_{j=0}^{k} \lambda_j f_j(p_{i-1}, p_i, p_{i+1}, g_{i-1}, g_i)\}$$

where, $p_1, p_2, \ldots, p_n$, denotes the human subjects present in the media stream, $g_i \in G;O$, where G and O denotes a human subject in a group and an outlier, respectively, each node of the CRF uses observation feature functions $f_j$ defined over the current pose and its left and right neighbors, k is the number of such features functions, including a transition feature and is the normalization factor.

5. The method of claim 1, wherein the Gaussian RBF kernel minimizes a weighted squared Euclidean distance between feature vectors of two arbitrary samples $X_i$, $X_j$, as shown in the equation below:

$$K(X_i, X_j) = \exp -\gamma \|X_i - X_j\|^2;$$

and where the free parameter $\gamma$ is learnt from a training data.

6. A system (601), comprising:
a memory (615) storing instructions;
one or more communication interfaces; and
one or more hardware processors coupled to the memory via the one or more communication interfaces, wherein the one or more hardware processors are configured by the instructions to:
receive a video stream of a scene from an egocentric camera embodied in a robot, the video stream comprising a plurality of image frames;
identify one or more groups of human subjects in the scene, wherein to identify the one or more groups, the one or more hardware processors are configured by the instructions to:
determine, using a deep learning-based model, a plurality of human body skeletons in the input images, and
predict a plurality of key-points for each of the plurality of human body skeletons,
associate, by the deep learning model, a plurality of confidence scores with the plurality of key-points, wherein a confidence score from amongst the plurality of confidence scores is associated with a key-point from amongst the plurality of key-points based on an orientation of a person of whom the human body skeleton is detected by the deep learning based model;
determine a plurality of features by categorizing the plurality of key-points with respect to the plurality of confidence scores into a plurality of labels;
predict, by a conditional random field (CRF) based probabilistic model, for each group of the one or more groups, at least one of one or more members of the each group and one or more outliers of the each group, the CRF model utilizing the plurality of features;
predict a f-formation in the each group using a multi-class Support Vector Machine (SVM) with a Gaussian Radial Bias Function (RBF) kernel based on the at least one of one or more members of the each group; and predict an approach angle of the robot to join the group using the multi-class SVM with the Gaussian RBF kernel.

7. The system of claim 6, wherein the plurality of key points on a human body skeleton from amongst the plurality of human body skeletons comprises nose, leftEye, rightEye, leftEar, rightEar, leftShoulder, rightShoulder, leftElbow, rightElbow, leftWrist, rightWrist, leftHip, rightHip, leftKnee, rightKnee, leftAnkle, and rightAnkle.

8. The system of claim 6, wherein to categorize the plurality of key-points, the one or more hardware processors are configured by the instructions to assign one of four labels to each of these key points based on the confidence values, the four labels comprises low corresponding to confidence score of 0-0.25, a medium corresponding to confidence score of 0.25-0.5, high corresponding to confidence score of 0.5-0.75, and very high corresponding to confidence score of 0.75-1.

9. The system of claim 6, wherein the CRF based probabilistic model is represented as:

$$P(g_{1:n}|p_{1:n}) = \alpha \exp\{\Sigma_{i=0}^{n}\Sigma_{j=0}^{k}$$

$$\lambda_j f_j(p_{i-1}, p_i, p_{i+1}, g_{i-1}, g_i)$$

where, $p_1, p_2, \ldots, p_n$, denotes the human subjects present in the media stream, $g_i \in G;O$, where G and O denotes a human subject in a group and an outlier, respectively, each node of the CRF uses observation feature functions $f_j$ defined over the current pose and its left and right neighbors, k is the number of such features functions, including a transition feature and is the normalization factor.

10. The system of claim 6, wherein the one or more hardware processor are configured by the instruction to enable a kernel to minimize a weighted squared Euclidean distance between the feature vectors of two arbitrary samples $X_i$, $X_j$, as shown in the equation below:

$$K(X_i, X_j) = \exp -\gamma \|X_i - X_j\|^2;$$

and where the free parameter $\gamma$ is learnt from a training data.

11. One or more non-transitory machine readable information storage mediums comprising one or more instructions which when executed by one or more hardware processors cause:

receiving, via one or more hardware processors, a video stream of a scene from an egocentric camera embodied in a robot, the video stream comprising a plurality of image frames;

identifying, via the one or more hardware processors, one or more groups of human subjects in the scene, wherein identifying the one or more groups comprises:

determining, using a deep learning-based model, a plurality of human body skeletons in the input images; and predicting a plurality of key-points for each of the plurality of human body skeletons;

associating, by the deep learning model, a plurality of confidence scores with the plurality of key-points, wherein a confidence score from amongst the plurality of confidence scores is associated with a key-point from amongst the plurality of key-points based on an orientation of a person of whom the human body skeleton is detected by the deep learning based model;

determining a plurality of features by categorizing the plurality of key-points with respect to the plurality of confidence scores into a plurality of labels, via the one or more hardware processors;

predicting, by a conditional random field (CRF) based probabilistic model, for each group of the one or more groups, at least one of one or more members of the each group and one or more outliers of the each group, via the one or more hardware processors, the CRF model utilizing the plurality of features;

predicting, via the one or more hardware processors, an f-formation in the each group using a multi-class Support Vector Machine (SVM) with a Gaussian Radial Bias Function (RBF) kernel based on the at least one of one or more members of the each group; and predicting, via the one or more hardware processors, an approach angle of the robot to join the group using the multi-class SVM with the Gaussian RBF kernel.

* * * * *